C. J. B. GAUME.
Electric-Motor.

No. 163,924.  Patented June 1, 1875.

WITNESSES:
A. W. Almqvist
A. F. Perry

INVENTOR:
C. J. B. Gaume
BY Munn
ATTORNEYS.

UNITED STATES PATENT OFFICE.

CHARLES J. B. GAUME, OF WILLIAMSBURG, NEW YORK.

IMPROVEMENT IN ELECTRIC MOTORS.

Specification forming part of Letters Patent No. 163,924, dated June 1, 1875; application filed May 1, 1875.

*To all whom it may concern:*

Figure 1:
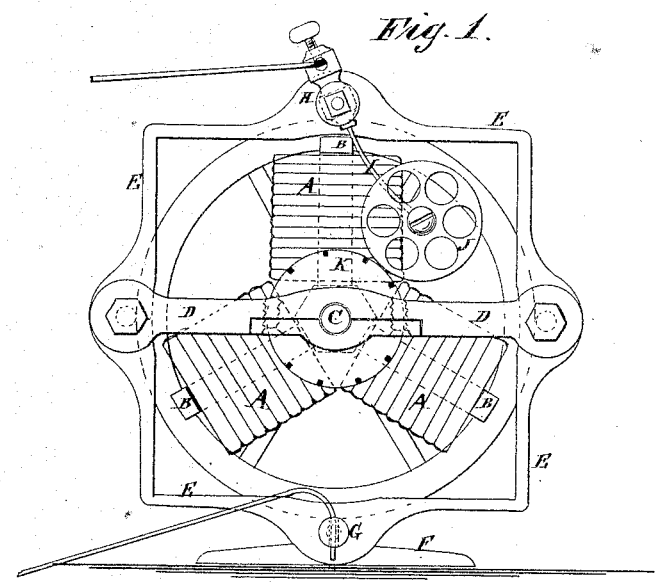
Figure 2:
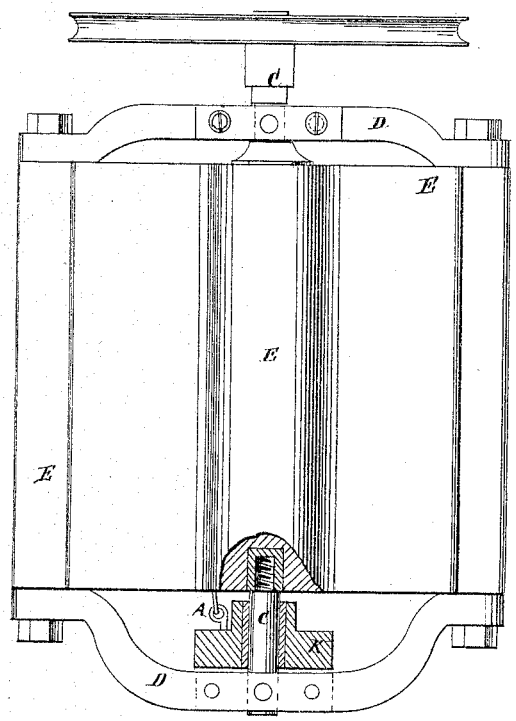

Be it known that CHARLES J. B. GAUME, of Williamsburg, in the county of Kings and State of New York, have invented a new and useful Improvement in Electro-Magnetic Engine, of which the following is a specification:

Figure 1 is an end view of my improved machine. Fig. 2 is a top view of the same.

Similar letters of reference indicate corresponding parts.

The object of this invention is to furnish an improved electro-magnetic engine which shall be so constructed that it may be built and run at much less expense than when constructed in the usual way.

The invention consists in the frame or box armature, made with four, more or less, plain or concaved sides, having half-round or square enlargements formed upon their outer or inner surfaces, as hereinafter fully described.

A is a coiled wire. B are the magnets, which are attached to the shaft C. The shaft C revolves in bearings in yokes D, attached to the ends of the box or frame E. The box or frame E is cast in one piece, and may be made with four, more or less, sides. The middle part of the inner surfaces of the sides of the box or frame armature E may be made plain, or it may be concaved. Upon the middle part of the sides of the box or frame E are formed half-round or square enlargements, or thickenings, or collectings of the metal into the middle parts of the said sides, to which the poles of the magnets most nearly approach. The armature E is provided with a foot, F, by which it is secured to the under or upper side of the table of the sewing-machine or other machine to be driven. To the armature E is attached a screw-clamp, G, to receive the wire from one pole of the battery. H is the screw-clamp for holding the wire from the other pole of the battery. The clamp H is connected with the armature E by means of a wooden or other insulating-support, and with it is connected, by a spring, I, the wheel J, which rolls along the face of the ordinary contact-wheel K. The wheel K is placed upon, but is insulated from, the journal of the shaft C, and with said wheel is connected one end of the wire A of the coil of each of the magnets B. The other ends of said wires are connected with the shaft C, so as to complete the circuit.

With this construction of armature the engine will run and do its work with a much smaller battery than is required with the ordinary construction, thus enabling it to be run at much less expense than when constructed in the ordinary way, and at the same time the cost of constructing the engine will be greatly lessened.

Having thus described my invention, I claim as new and desire to secure by Letters Patent—

The frame or box armature E, made with four, more or less, plain or concaved sides, having half-round or square enlargements formed upon their outer or inner surfaces, substantially as herein shown and described.

CHARLES J. B. GAUME.

Witnesses:
JAMES T. GRAHAM,
T. B. MOSHER.